March 19, 1935. A. E. LARSEN 1,995,127
ROTATIVE WING MOUNTING
Original Filed Aug. 28, 1931 2 Sheets-Sheet 2
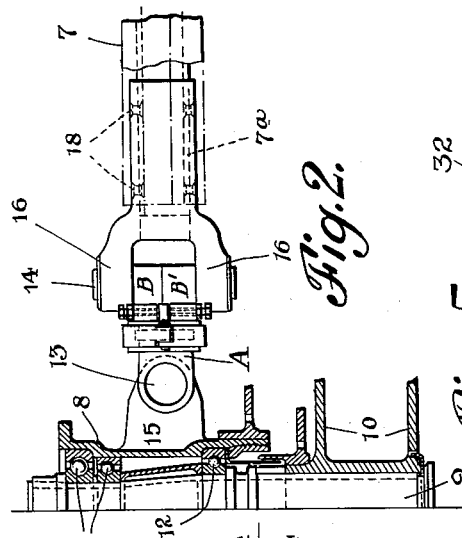
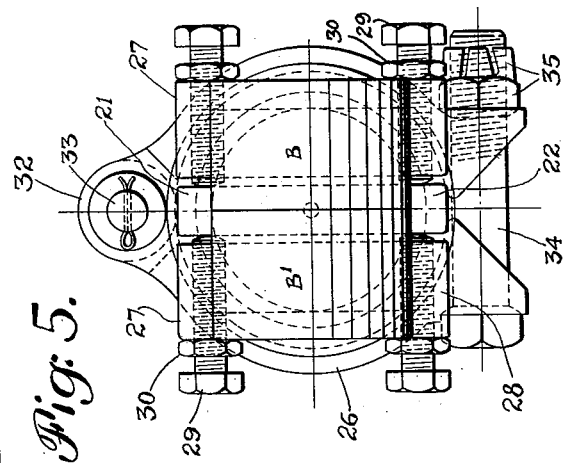
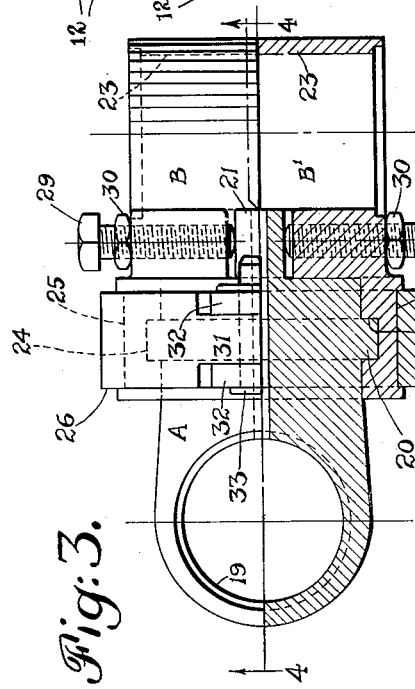
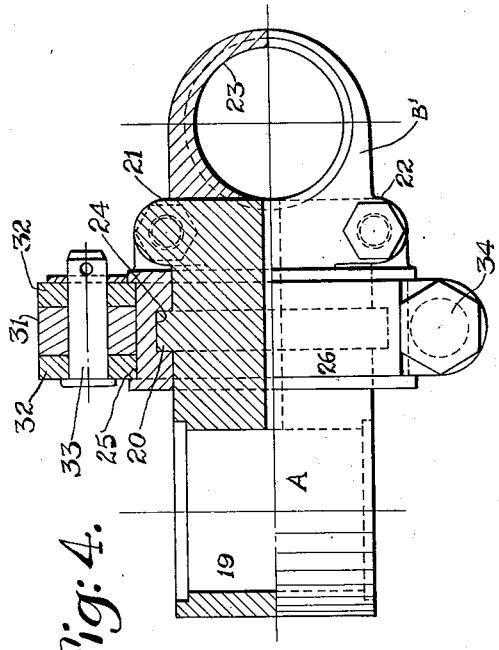
INVENTOR.
Agnew E. Larsen
BY
ATTORNEYS.

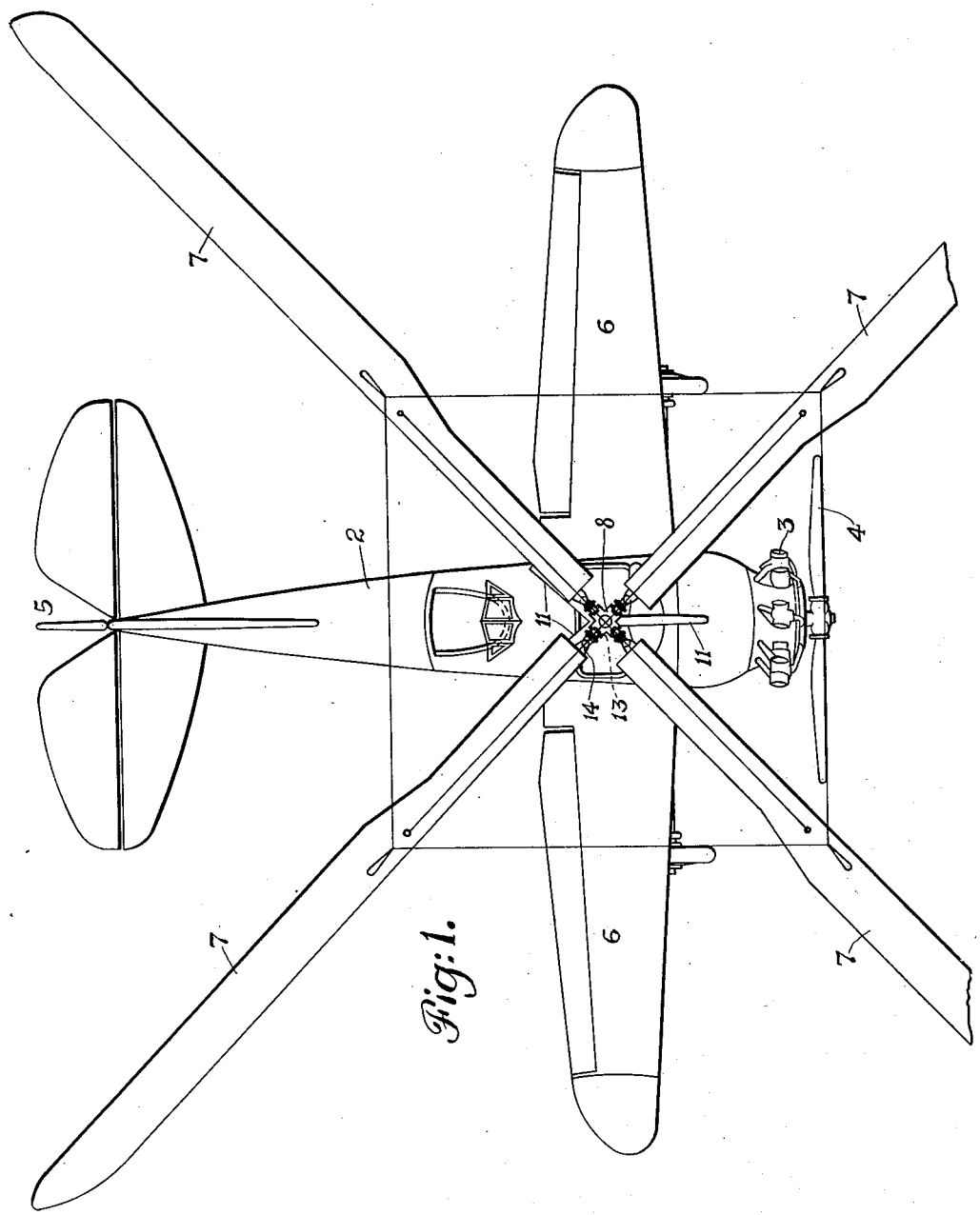

Patented Mar. 19, 1935

1,995,127

UNITED STATES PATENT OFFICE 1,995,127

ROTATIVE WING MOUNTING

Agnew E. Larsen, Huntingdon Valley, Pa., assignor to Autogiro Company of America, Philadelphia, Pa., a corporation of Delaware Application August 28, 1931, Serial No. 559,824
Renewed September 2, 1933

7 Claims. (Cl. 244—19)

This invention relates to rotative wing mounting for aircraft and is especially concerned with the mounting of the individual sustaining wings themselves upon their common, central, rotative hub or axis structure, and the invention contemplates certain improvements in construction and operation of the mountings for the wings and thence of the sustaining rotor as a whole.

The invention, further, is especially useful in, and has a particular cooperative relation with, the general type of aircraft disclosed in the copending application of Harold F. Pitcairn, Serial No. 552,298, filed July 22, 1931, in which the craft is provided with a forward propulsion means and with rotative sustaining wing means, which latter are mounted about a common generally upright axis and positioned to be rotated by relative air flow across them in flight.

One of the primary objects of the invention involves simplification of the wing mounting structure as compared with forms of construction heretofore employed, and at the same time simplification of the attaching portions of the wing spar structure itself.

Another important purpose of the invention is to improve the aerodynamic efficiency of the sustaining rotor and thus of the craft as a whole, and further to accomplish this by a concentration of the wing mounting structure in unusually close proximity to the center of rotation and by placing certain of the protruding parts of the mounting structure in position to be behind or shielded by other parts, considered with relation to the path of rotation.

From the foregoing, in turn, flows another advantage, in that the aerofoil section itself, of the wing, may be carried in closer toward the hub or center of rotation if desired.

The invention further contemplates increasing the safety and security of the wing mounting means and incidence adjustment mechanism.

More specifically, the invention contemplates an air rotor construction in which the wings are mounted for rotation about a common upright axis by mounting means which may comprise one or more pivots or articulations, with axis or axes extending substantially transverse to the longitudinal line or axis of the wing means, and in which a means of wing incidence variation or adjustment is placed between the central common axis and an individual wing pivot axis or flexible joint.

Still further, where the pivot construction embodies an individual vertical pivot axis for each wing, as well as an individual horizontal pivot axis, the present invention contemplates the location of the incidence altering means preferably between said two pivot axes. At the same time, I propose to combine the advantages of offsetting the vertical pivot axis from the central axis of rotation (as disclosed in copending application of Juan de la Cierva, Serial No. 622,635, filed July 15, 1932, with the advantages of an inward extension of the wing surfacing, or stream-line section proper, farther inward toward said center of rotation than has heretofore been possible, which results in increased efficiency of the sustaining system and at the same time reduced drag losses.

Specifically, this is accomplished, in accordance with the present invention, by mounting the wing incidence changing mechanism between said offset pin and said center of rotation, and preferably between the two articulating pins themselves. The incidence varying device may thus be formed as a part of, or mounted on, or substituted for, what is known as the "extension block" between the horizontal articulation (which permits the wing to swing up and down, in flight, to various positions of equilibrium between lift and centrifugal forces) and the vertical articulation (which permits the wing to swing, in flight, forwardly and rearwardly in its path of rotation to various positions of equilibrium between forces tending to accelerate and to retard the rotation of the wing).

The invention further contemplates the formation of the incidence varying mechanism, preferably as an extension block, in two relatively rotatable sections, one of which sections is in turn, split or divided into two halves; the two sections being angularly adjustable by means of opposed lugs and adjusting screws, and clamped together, by means of a suitable clamping ring, in interlocked relation so as to be held as against separation under the action of the centrifugal force of the wing.

The foregoing objects and advantages, together with others which may be incident to the invention, or which will occur to those skilled in the art, will appear more clearly from the following description, taken together with the accompanying drawings, in which drawings:—

Fig. 1 is a somewhat diagrammatic top plan view of a rotative-wing aircraft embodying the present invention, with the wing mounting structure necessarily shown on a small scale;

Fig. 2 is a fragmentary vertical section through the central hub or axis structure of the sustaining rotor of Fig. 1, showing a part of one wing, with its mounting mechanism, in elevation, the view being taken in a direction looking toward the trailing edge of the wing;

Fig. 3 is an enlarged detail view of the intermediate portion of the wing mounting structure shown in Fig. 2 including the incidence varying mechanism, half in elevation and half in longitudinal vertical mid-section;

Fig. 4 is a top plan view of the structure of Fig. 3, half in section on the line 4—4 of Fig. 3; and Fig. 5 is an end elevational view of the structure of Fig. 4, taken at the right of Fig. 4.

By reference first to Figs. 1 and 2, it will be seen that I have illustrated an aircraft of the rotative wing type, having a body or fuselage 2, power plant and propeller 3, 4, empennage 5, supplemental fixed lifting surfaces 6, and a primary sustaining system of rotating wings 7, which latter are supported or mounted above the body of the craft by means of the common central hub or axis structure 8 which is mounted for rotation about a generally upright shaft or spindle 9 fixed in the apex box 10 which may be carried on said body by means of the three pylon legs 11, suitable bearings 12 being interposed between the fixed shaft 9 and the rotative axis or hub 8.

The immediate connection between each wing 7 and the common axis structure 8 is a flexible connection, in this instance comprising a plurality of individual pivot axes or articulations; a horizontal articulation or pivot pin 13 being provided for the up and down swinging of the wing and a vertical pivot or articulation 14 being provided for forward and rearward swinging of the wing with respect to its general rotative path. The horizontal pin may be mounted between a pair of ears or lugs 15 secured to the hub or axis 8 and the vertical pin may be mounted between forked jaws 16, which are formed as a part of the socket structure 17, which latter is secured to the main tubular spar 7a of the wing, as by means of a plurality of rivets 18.

The connection between the horizontal and vertical articulations, now known as the extension block, provides for the offsetting of the vertical articulation pin 14 from the central axis of rotation (for reasons set forth in the aforementioned copending application of Juan de la Cierva); and by the present invention I combine with the extension block, or I substitute therefor, my improved incidence varying mechanism, which is composed of three main parts, A, B, and B'.

Referring now to Figs. 3, 4 and 5, it will be seen that part A comprises one half of the rotatable connection and that the parts B and B' together form the other half. The part A is bored at 19 to receive the horizontal articulation 13, and toward its outer end has a circumferential rib 20, and beyond said rib upper and lower adjusting lugs 21 and 22.

The parts B and B' are counterpart elements, each bored, as at 23 to form half of the vertical pin receiving aperture, and each having a semi-circular internal peripheral recess 24 to engage and interlock with the rib 20, and an external peripheral recess 25 to receive the clamping ring 26. Each part B and B' is further provided with an upper and a lower adjusting lug 27 and 28, carrying adjusting screws 29 and lock nuts 30, said adjusting screws being positioned to bear upon the sides of the lugs 21 and 22 as best seen in Figs. 3 and 5, whereby the angular relationship between the first half of the joint (A), and the second half of the joint (B, B') may be altered.

The ring 26 is a split ring formed of two parts, one having an ear 31 fitted between the fork members 32 of the other, said ear and the fork members being pivoted together as by pin 33. The ring 26 is clamped tightly around the assembled parts A, B, B', by means of the bolt 34, carrying nuts 35, the groove 24 of section B, B' being thus interlockingly engaged with the rib 20 of section A as against the centrifugal pull of the wing. The two parts B and B' are further retained in their proper assembled relation, by means of the forks 16 and vertical pin 14 as clearly seen in Fig. 2.

It will be evident that, by providing a sufficient range of adjustment, various angular relationships between pivots 13 and 14 may be had, if desired.

On the other hand, if the practice as now carried out be followed, which is to secure the wing spar to its forked fitting in such position as initially to give to the wing the approximate degree of incidence desired when the bore of the forks 16 is at right angles to the pivot 13, then the device may be constructed to provide only a small range of adjustment and the angular relationship of pivots 13 and 14 will be altered only slightly, since the adjustment range need then only be of such extent as is required to adjust incidence for manufacturing inaccuracies of any particular blade, or to equalize the aerodynamic action of the several blades of the rotor, or to modify slightly the initial incidence setting of all the blades should that prove desirable for a given aircraft.

It will now be clear that the objects and advantages hereinbefore set forth are attained by a very simple construction, which is of small overall size and especially of minimum length considered with relation to the radial extension of the mounting mechanism from the center of rotation; that the divided joint construction is firmly secured in assembled relation; that parts of the clamping means and adjusting means are so placed with relation to the extension block and the wing fork that little head resistance is presented; and that numerous other advantages are involved in this construction over those in prior use.

I claim:—

1. In an aircraft, a generally upright rotative axis structure, a rotative sustaining wing positioned for rotation around the axis by autorotational actuation under the influence of flight forces, mounting means for the wing including a pair of pivot devices and wing incidence adjustment means interposed between said pivot devices.

2. In an aircraft, a generally upright rotative axis structure, a rotative sustaining wing arranged for rotation about the axis by autorotational actuation under the influence of flight forces, mounting means for securing the wing to the axis structure including a substantially horizontally extending pivot and a substantially vertically extending pivot, an extension block between said pivots, and incidence changing mechanism on the extension block.

3. In an aircraft, a generally upright rotative axis structure, a rotative sustaining wing arranged for rotation about the axis by autorotational actuation under the influence of flight forces, mounting means for securing the wing to the axis structure including a substantially horizontally extending pivot and a substantially vertically extending pivot, an extension block between said pivots, and incidence changing mechanism on the extension block, with parts of said incidence changing mechanism mounted in line with other parts mentioned, considered with relation to the direction of rotation.

4. In an aircraft having a wing axis structure and a rotative sustaining wing, a mounting device for the wing including an articulation pivot and an incidence-adjusting means comprising two relatively rotatable sections, one of said sections being divided into a plurality of parts which are in releasably interlocked engagement with the other section, and said parts being formed with alined bores which co-operate to provide a common bearing for said articulation pivot.

5. In an aircraft having a wing axis structure and a rotative sustaining wing, a mounting device for the wing including an articulation comprising a fork and a pivot mounted therein, and an incidence-adjusting means comprising two relatively rotatable sections, one of said sections being divided into a plurality of parts which are in releasably interlocked engagement with the other section, and said parts being formed with alined bores which co-operate to provide a common bearing for said articulation pivot, said fork and said pivot tending to hold the parts of the incidence-adjusting device in assembled relation.

6. In an aircraft having rotative wings, the combination with a wing spar and a rotative axis for the wing, of an incidence-changing device including two relatively rotatable sections, one having a connection to said axis and the other having a connection to said spar, at least one of said connections comprising a pivot with its axis generally transverse to said spar, one of said sections having an external rib and the other of said sections having an internal recess interlockingly engaged with the rib as against pulling apart by the centrifugal force of rotation of the wing, the latter section being longitudinally divided into a plurality of parts, and means for clamping said parts in assembled relation about said first-mentioned section.

7. In an aircraft having a wing axis structure and autorotative sustaining wing, a mounting mechanism for the wing including a flight articulation pivot intersecting the longitudinal axis of the wing and lying substantially in a vertical plane containing the rotational axis, to provide for generally fore-and-aft swinging movements of the wing in the general plane of rotation, and incidence varying means located radially inwardly of said flight pivot and having a normal range of adjustment such that the incidence setting of the wing is always within the autorotational range of incidence angles.

AGNEW E. LARSEN.